Nov. 30, 1937.     T. P. SALLEY     2,100,819
SKID CHAIN APPLYING DEVICE
Original Filed March 12, 1936
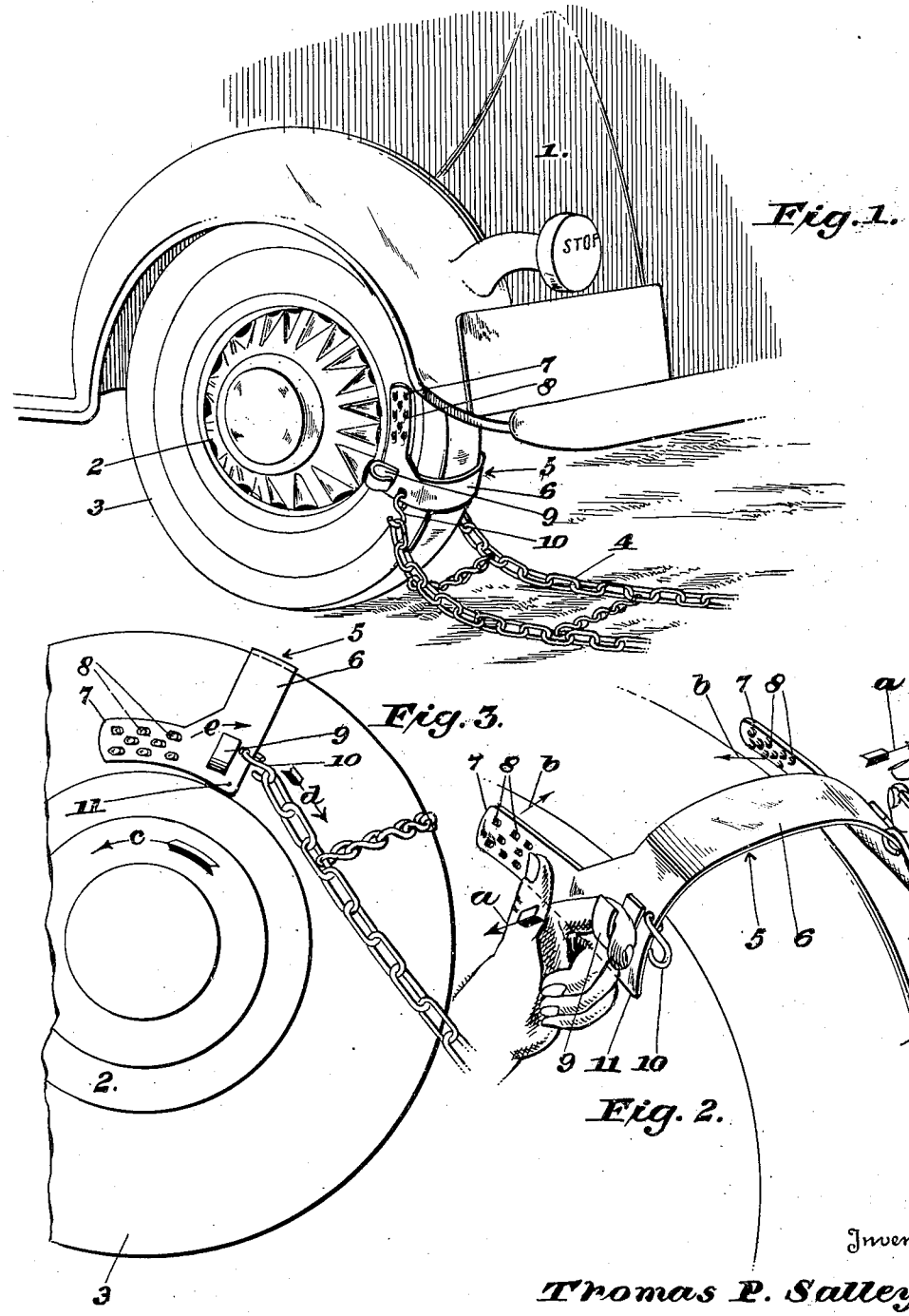
Inventor
*Thomas P. Salley.*
By Munn, Anderson & Liddy
Attorney Patented Nov. 30, 1937

2,100,819

UNITED STATES PATENT OFFICE 2,100,819

SKID CHAIN APPLYING DEVICE

Thomas P. Salley, Roselle, N. J.

Application March 12, 1936, Serial No. 68,520
Renewed August 24, 1937

2 Claims. (Cl. 152—14)

This invention relates to improvements in devices for assisting in applying skid chains to automobile wheels, and its objects are as follows:

First, to provide a one-piece arcuate bow of resilient material, preferably metal, which has integral roughened leaves to engage the side walls of the tire adjacent to the felly, said bow contacting the tread of the tire and having the skid chain temporarily attached to it, the aforesaid engagement of the leaves with the side walls stabilizing the bow and preventing its being twisted out of position when the hardest pull is exerted on the device.

Second, to provide the foregoing device with heels which are adapted to rest on the felly to act as fulcrums for pressing the roughened leaves against the side walls when the pull of the skid chain tends to rock the device.

Other objects and advantages will appear in the following specification, reference being had to the accompanying drawing, in which:

Figure 1 is a perspective view of a portion of the rear end of an automobile illustrating the application of the device to the tire preparatory to laying on the skid chain.

Figure 2 is a detail perspective view showing how the resilient bow is spread preparatory to attaching it to the tire.

Figure 3 is a fractional side elevation of the tire showing the applying device in place, but also illustrating the function of the heels as fulcrums.

It is a common experience with automobile drivers to have difficulty in applying anti-skid chains, more commonly known as skid chains, because it is generally necessary to jack up first one side of the rear axle and then the other, so that the skid chain can be laid on to the wheel and the ends followed on around to make the fastening. The instant device is intended to enable the application of a skid chain without having to jack up the end of the axle of the respective wheel.

In the drawing the automobile 1 has a wheel 2 with a tire 3 to which the skid chain 4 is intended to be applied. This chain is stretched out full length to the rear of the automobile so that when the applying device plays its part the chain will be drawn upwards and laid on to the tread of the tire 3.

The applying device is generally designated 5. It comprises a bow 6 which goes crosswise of the outside of the tread of the tire 3. The bow has a pair of integral leaves 7 (Fig. 2) which, when the device 5 is applied to the tire in the intended manner, point in the forward direction of rotation of the wheel. These leaves are internally roughened at 8. The roughening is of such a nature that it will secure a grip on the side walls of the tire, but the roughening is not in the nature of sharp serrations which would cut the tire when pressure is brought to bear.

The bow 6 and leaves 7 are made of resilient metal of a sufficiently heavy gauge to stand up under the rather rough work that has to be done. The tension of the bow is inward so that it will close the leaves 7 against the side walls of the tire.

A pair of finger grips 9 enable the operator to secure a grip on the device (Fig. 2) for spreading it preparatory to applying it to the tire. Located adjacently to the finger grips are hooks 10 to which the ends of the skid chain 4 are temporarily attached. The bow 6 includes heels 11 which may or may not be made to bear against the wheel 2. When these heels do bear they will actually rest on the margin of the clincher ring on the outside and the corresponding margin of the felly on the inside.

The operation is readily understood. In order to mount the applying device to the tire 3 the operator grasps the finger grips 9 as shown (Fig. 2), and pulls in opposite directions (arrow $a$). He then lets go, whereupon the leaves 7 close in under the swell or the tire (arrow $b$), firmly gripping the side walls (Fig. 1). The ends of the chain 4 which were previously laid out straight, as already stated, are then hooked on and the automobile is rolled forwardly. This makes the wheel 2 turn in the direction of arrow $c$ (Fig. 3). The skid chain will be pulled up and over, and when the device 5 returns substantially to the original position, it is taken off, whereupon it will be a relatively easy matter to fasten the ends of the skid chain together.

It is to be observed that when the skid chain is pulled up and over the resistance in the direction of arrow $d$ it will tend to turn the device in the direction of arrow $e$. It is here where the integral lateral leaves 7 play an important part. Any tendency which the device 5 may have to turn will be prevented by the engagement of the leaves for a considerable distance along the side walls of the tire and under the swell thereof.

The lever action thus set up makes the roughening 8 grip the tire so firmly that no perceptible motion will occur anywhere in the device. This purpose can be accentuated by having the heels 11 rest on the margins of the wheel 2. When the foregoing pull occurs in the direction of arrow d the heels 11 will act as positive fulcrums which will insure the tight engagement of the roughened leaves 7 with the side walls of the tire, as already explained.

I claim:

1. A skid chain attaching device comprising a bow of resilient material to be applied crosswise of the tread of a tire, the ends of the bow having integral, substantially parallel internally roughened leaves, and said ends of the bow also having heels adapted to rest on the margins of a wheel carrying the tire, and means at which to hook on the ends of a skid chain, said means being carried by the bow adjacent to the heels so that the pull of the chain will convert the heels into fulcrums serving to jam the roughened leaves against the side walls and prevent twisting of the bow out of position.

2. A skid chain applying device comprising a bow of resilient material having an inward and closing tension, a pair of leaves integral with the bow and extending substantially at right angles from the bow at said ends so as to define heels at the juncture of the bow with said leaves, said leaves being roughened on their confronting surfaces so as to partially penetrate the tire walls and obtain a firm grip, and hooks mounted on the bow substantially at the heels for the attachment of chain ends.

THOMAS P. SALLEY.